(12) United States Patent
Bonnet et al.

(10) Patent No.: US 8,020,368 B2
(45) Date of Patent: Sep. 20, 2011

(54) AIRCRAFT JET ENGINE PROVIDED WITH A DEVICE FOR REDUCING PROPULSION JET NOISE

(75) Inventors: Jean-Paul Bonnet, Poitier (FR); Joel Delville, Poitiers (FR); Peter Jordan, Rom (FR); Estelle Laurendeau, Vouneuil-Sous-Biard (FR)

(73) Assignees: Universite de Poitiers, Poitiers Cedex (FR); Centre National de la Recherche Scientifique-CNRS, Paris Cedex (FR)

( * ) Notice: Subject to any disclaimer, the term of this patent is extended or adjusted under 35 U.S.C. 154(b) by 1295 days.

(21) Appl. No.: 11/649,721

(22) Filed: Jan. 4, 2007

(65) Prior Publication Data

US 2010/0251724 A1    Oct. 7, 2010

(51) Int. Cl.
*F02K 1/38* (2006.01)

(52) U.S. Cl. ........ 60/262; 60/770; 239/265.17; 181/221

(58) Field of Classification Search .................... 60/231, 60/262, 263, 264, 770; 239/127.3, 265.17, 239/265.19, 265.23, 265.25, 433; 181/220, 181/221; 415/914
See application file for complete search history.

(56) References Cited

U.S. PATENT DOCUMENTS

| 2,990,905 | A | * | 7/1961 | Lilley | 181/220 |
| 3,188,024 | A | * | 6/1965 | Schneider | 244/52 |
| 3,599,749 | A | | 8/1971 | Millman | |
| 4,254,620 | A | * | 3/1981 | Wright et al. | 60/263 |
| 6,571,549 | B1 | | 6/2003 | Stanek | |

FOREIGN PATENT DOCUMENTS

| EP | 1493912 A1 | 5/2005 |
| FR | 1195859 A1 | 11/1959 |

* cited by examiner

*Primary Examiner* — Louis Casaregola
(74) *Attorney, Agent, or Firm* — Blank Rome LLP

(57) ABSTRACT

A nozzle allowing the reduction of noise generated by aircraft jet engines having at least one output ring which disturbs the propulsion jet, and having at least one pair of conduits from which the propulsion of jet air is ejected at the output of the nozzle. The conduits of each pair are disposed convergent with respect to each other in order to generate a triangle of interaction of the air jets at the output ring.

18 Claims, 2 Drawing Sheets

AIRCRAFT JET ENGINE PROVIDED WITH A DEVICE FOR REDUCING PROPULSION JET NOISE

The present invention relates to the field of aircraft jet engines, and in particular devices allowing the reduction of noise generated by aircraft jet engines.

Noise pollution coming from an aircraft occurs mainly during the takeoff and approach phases, and is located in particular at the aircraft jet engine and the jet coming out thereof.

On account of the increasing pollution imposed on those living near the airport connected with the noise generated by the engines, which is exacerbated by the increase in traffic, limiting the noise at takeoff or landing constitutes today, but also in the future, a major path for research.

This is because the change to Chapter 4 of the ICAO (International Civil Aviation Organisation) provides for the imposition of a reduction of 10 dB compared with Chapter 3 from 1 Jan. 2006.

To date, no effective method is available. There are a good many methods based principally on mixing the propulsion jets at the output of aircraft jet engines, the propulsion jets consisting of a hot primary jet coming out of the jet engine nozzle, and a secondary flow flowing between the external wall of the nozzle and the internal wall of the jet engine, but they remain limited for the purpose of reduction by the number of decibels required.

In particular, passive methods consisting of modification of the geometry of the lip of the jet to be manipulated are known from the prior art. These devices, such as lobe mixers and miniature flaps, are however removable with great difficulty.

Amongst the active methods of controlling the mixing adapted to subsonic or supersonic jets, there are pneumatic or mechanical actuators. However, as the region of maximum receptiveness is situated at the output lip of the jet, the characteristic graduations of the flow are therefore very small and at very high frequencies. These constraints, added to the fact that the region concerned is difficult to access in the case of commercial aircraft jet engines, mean that such jet control devices are poorly adapted to implementation in situ.

One method, currently under development at NASA with the Boeing company, consists of using chevrons placed at the trailing edges of the engine outputs. However, the use of such chevrons has a number of drawbacks.

In particular, on account of the weight added to the engine, combined with their permanent nature, the chevrons impose a loss of thrust of the order of 0.3% per engine, thus leading to a reduction in performance, perhaps even excess fuel consumption throughout the entire cruising period, their action in this phase nevertheless being unnecessary.

Moreover, the physical chevrons provide equipment "fixed" in its geometry: the chevrons are therefore configured to achieve a level of performance satisfactory for all speeds of the aircraft. They offer a compromise not routinely optimised for all speeds. In particular, as the engine speed is very different according to the phase of the flight, depending on whether it is an aircraft takeoff, approach or landing, the geometry of the chevrons should be adapted to the speed concerned.

In order to overcome the latter drawback, other methods, referred to as partial retraction methods, are in the process of being developed. Amongst these methods, which consist of modifying the angles of penetration of the chevrons, one approach consists of using shape memory materials. However, such methods remain relatively complex to implement and not very adaptive.

Furthermore, through the document FR-A-1 195 859, a nozzle is known in which auxiliary jets are ejected at the trailing edge of the nozzle, at points distributed around the main jet. These auxiliary jets are inclined in the direction of the axis of the nozzle and also have a tangential component, so that they can converge in pairs. This tangential component is however very small, the jets converging a large distance away from the output of the nozzle, typically at a distance indicated as necessary of the order of five times the diameter of the nozzle.

The document U.S. Pat. No. 6,571,549 also describes a method of reducing the noise created by a nozzle by ejecting peripheral pulsed auxiliary jets. These jets are inclined with respect to the axis of the nozzle, but in radial planes, with no tangential component. This document does not therefore describe convergent jets.

The document U.S. Pat. No. 1,493,912 describes the combination of a fluid chevron system and a configurable heat shield. As in the previous document, the auxiliary jets of the fluid chevrons are inclined with respect to the axis of the main jet, but no tangential component is provided. The device described in this document requires the addition of mechanical parts thus leading to an engine that is heavier and tricky to implement.

The present invention therefore intends to remedy the drawbacks of the prior art by proposing a noise reduction device, simple to implement, and providing only very little added weight.

Another aim of the present invention is to propose a noise reduction device adaptable according to the engine speed, this being different depending on whether a take-off, approach or landing phase is concerned. In particular, the device according to the invention has the advantage of not operating during the cruising phase for which such a device is unnecessary, and therefore of not increasing fuel consumption.

Another aim of the present invention is to provide a noise reduction device capable of being mounted on the engine equipment already in service, with no major modification of existing items.

To do this, the present invention concerns an aircraft jet engine comprising a nozzle ejecting a propulsion jet, or comprising the confluence of two propulsion jets, said nozzle having one or two output rings which comprise means of disturbing said primary jet or jets consisting of at least one pair of conduits via which jets of air are ejected, said conduits opening at the output of said nozzle, the conduits of each pair being disposed convergent with respect to each other in order to generate at the output a triangle of interaction of the air jets, the conduits of each pair converging towards each other at the output of said nozzle with an angle of convergence at the tip lying between 40 degrees and 70 degrees, and preferably an angle of convergence of the order of 60 degrees.

The phenomena in play are therefore on a much smaller scale, by approximately an order of magnitude, than in the document FR-A-1 195 859, since the convergence of the jets occurs at a distance of the order of half or a fifth of the diameter of the nozzle in the invention, as against five times the diameter in the aforementioned document.

It would seem that, at this scale, both the effects of the fluid chevrons and the heat shield of the document U.S. Pat. No. 1,493,912 would be obtained.

Advantageously, the conduits are disposed on the output ring in order to have, with respect to the axis of the primary jet, an angle of penetration lying between 8 degrees and 40 degrees, and preferably an angle of penetration of the order of 20 to 35 degrees.

Advantageously, the disturbance means comprise 1 to 24 pairs of conduits.

Advantageously, the pairs of conduits are distributed over the output ring so that a conduit converging in one direction is placed side by side with a conduit, of opposite convergence, of the adjacent pair of conduits.

Advantageously, the conduits consist of pipes distributed over the external wall of said output ring.

Advantageously, the conduits consist of channels incorporated into the thickness of the output ring.

Advantageously, the conduits are connected to a compressed air supply via an air supply conduit, the supply being implemented preferably at the high pressure part of said jet engine. According to an advantageous embodiment of the invention, the air supply conduit of one conduit of a pair constitutes the air supply conduit of the conduit of the adjacent pair which has an opposite convergence.

Advantageously, the conduits have a diameter 20 to 50 times smaller than that of the nozzle at the output.

Advantageously, the output jets converge with respect to the axis of said primary jet with an angle lying between 8 degrees and 40 degrees.

Advantageously, the air jets consist of air jets whereof the throughput is controlled.

Advantageously, the pairs of conduits can be distributed symmetrically or not over the output ring of said nozzle.

In a particular embodiment, the pairs of conduits can be distributed solely over half a ring, in the lower part, in order to reduce the required throughputs; this configuration makes it possible to reduce the noise perceived in the areas situated underneath the aircraft; the dissymmetry created on the propulsion jet can also contribute towards increasing lift by creating vertical thrust, thus making it possible to reduce the ascent time of the aircraft.

In a particular embodiment, means are provided for dragging rotationally over themselves the air jets ejected by said conduits. They can for example be fixed blades or a free-running helix mounted inside or at the output of the conduits, helical grooves formed on the internal surface of the conduits, or conduits themselves having a helical shape.

Also in a particular embodiment, the mass ratio between the throughput of the air jets ejected by said conduits and that of the propulsion jet lies between approximately 0.3% and 2%. This is a small throughput entirely compatible with suitable operation of the engine.

The present invention also relates to an aircraft comprising jet engines as previously described.

The invention will be better understood with the help of the description, given below on a purely explanatory basis, of one embodiment of the invention, with reference to the accompanying drawings in which:

FIG. 1 illustrates a nozzle output (1) of an aircraft jet engine, provided with a device making it possible to reduce the noise caused by the propulsion jets of the jet engine, in particular during the aircraft takeoff or approach phases.

Figure 1:
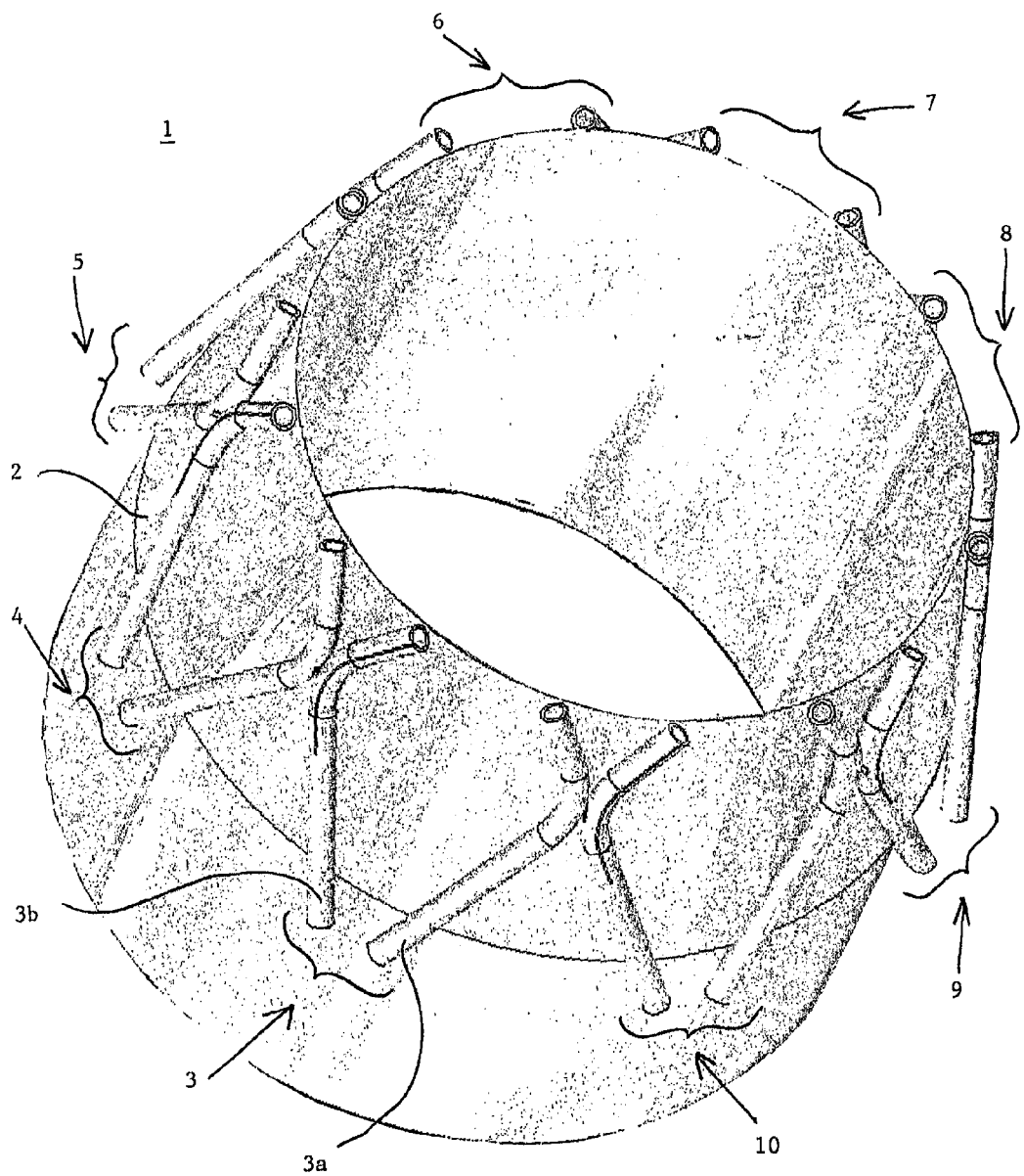
FIG. 1 illustrates a perspective view of a nozzle output equipping an aircraft jet engine according to the invention.

To do this, said nozzle output (1) consists, at its output, of an output ring (2) comprising control jets.

Preferably, said output ring (2) comprises jets that converge with respect to the axis of the propulsion jet with an angle of the order of 20 to 35 degrees.

Said nozzle (1) also comprises disturbance means (3 to 10) intended to disturb the propulsion jet at the output of said nozzle (1).

Said disturbance means (3 to 10) consist of pairs of pipes (3a, 3b, ..., 10a, 10b) distributed over the external wall of said ring (2) and having an output aperture at the free end of said ring (2). Of course, this is an example configuration. It is of course self-evident that said pairs of pipes can also be incorporated into the thickness of said ring (2).

Said pipes are advantageously connected to the high pressure part of the jet engine via an air supply conduit (not depicted). Thus, compressed air jets are sent to the pipes in order to be ejected at the output of said nozzle (1).

Advantageously, the velocity of the compressed air is substantially identical to the velocity of the propulsion jets and the mass ratio between the throughput of the air jets ejected by said conduits and that of the propulsion jet lies between approximately 0.3% and 2%.

The pipes (3a, 3b, ..., 10a, 10b) of each pair, advantageously bent, are disposed on the output ring (2) so as to face each other.

The pipes of each pair are disposed with respect to each other so that the compressed air jets, at the output of said pipes, generate fluid interaction triangles with an angle of convergence of the order of 60 degrees.

Figure 2:
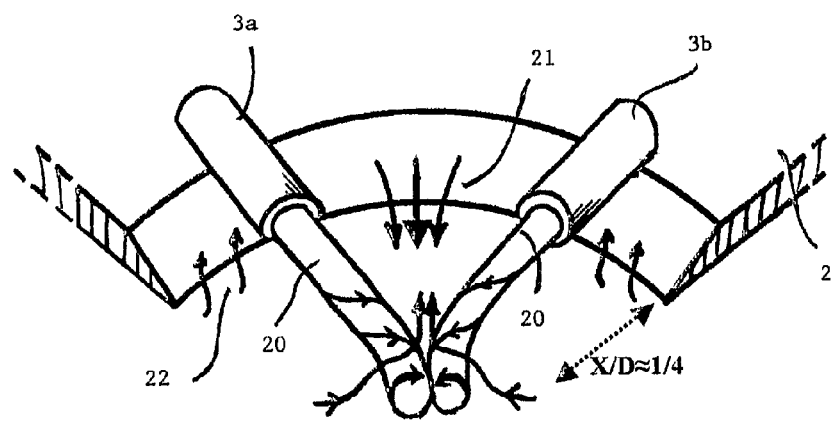
FIG. 2 illustrates the operation of the invention.

It can be seen in FIG. 2 that the inclination of the pipes 3 gives the jets 20 which originated therefrom a tangential velocity component which, on account of the interaction with the propulsion jet, causes a rotation of the jets 20 on themselves, in the reverse direction for two convergent jets. This rotation can be furthered by means such as those mentioned above. Furthermore, the aforementioned angle of convergence causes the two convergent jets to meet a short distance away, of the order of a quarter of the diameter of the nozzle.

When the implementation concerns the ring separating the cold outer jet and the hot central jet, the rotation of the jets 20 drags external cold air 21 inside the propulsion jet between the convergent jets, hot air 22 on the contrary going outside the jets 20.

This results in a homogenisation of the temperatures from the output of the nozzle, able to contribute to reducing the noise generated by this nozzle. It can also be considered that a heat shield effect occurs, also favourable to reducing radiated noise.

Figure 3:
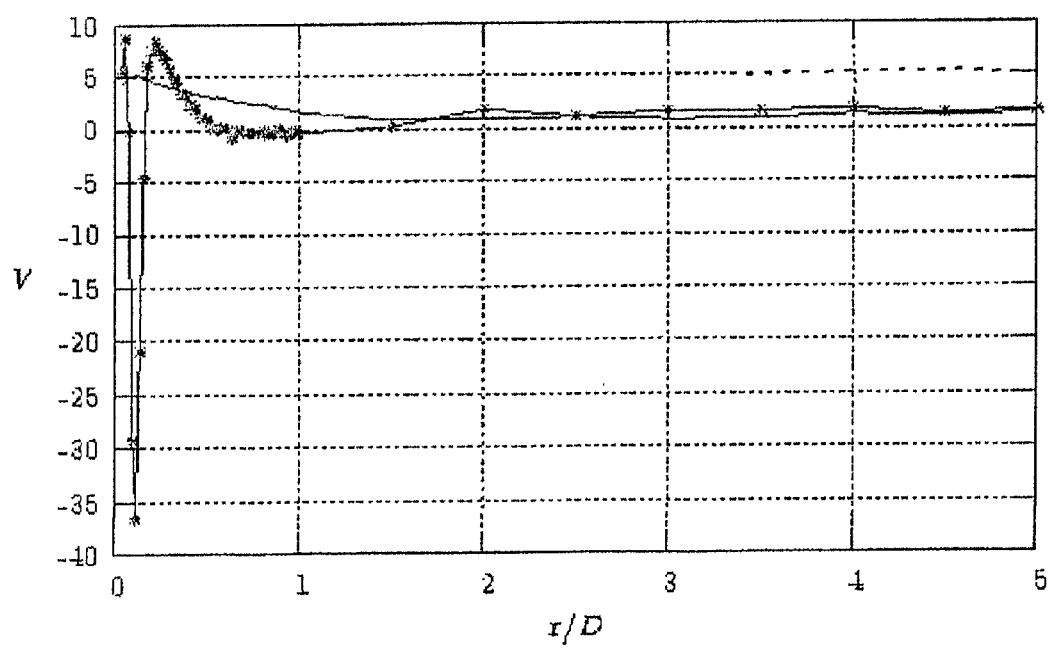
FIG. 3 is a diagram of radial velocities as a function of distance at the output of the nozzle.

FIG. 3 shows the radial velocity as a function of distance at the output of the nozzle, expressed here by its ratio to the diameter of the nozzle. The presence of a negative radial velocity component (perpendicular to the axis of the propulsion jet) equal to approximately 40% of the velocity of the propulsion jet shows the importance of the dragging of cold fluid into the heart of the hot propulsion jet. This dragging takes place very close to the output of the nozzle, typically in the first quarter of a diameter. This large penetration and its location close to the output of the jet are related to the angle chosen for the convergence of the jets.

Furthermore, in order to further increase the disturbance of the primary jet, said "fluid triangles" thus obtained are inclined to the axis of the primary jet by an angle, referred to as the angle of penetration, lying between 8 degrees (small penetration) and 40 degrees (large penetration).

According to one embodiment of the invention, such an inclination is obtained by the very fact of the convergence of the external wall of the output ring (2) of said nozzle (1), this advantageously converging with respect to the axis of said primary jet with an angle lying between 8 degrees and 40 degrees.

According to another embodiment, this inclination is obtained by the orientation of the conduits incorporated into the thickness of the ring.

According to another embodiment, the inclination of all or some of the pairs of jets can be directed towards the outer jet.

However, this inclination can be readjusted, perhaps even obtained directly, by mechanical construction according to the desired disturbance, and consequently the necessary penetration force.

As regards the disposition of the pipes at the output ring (2), said pairs of pipes are distributed so that the pipe converging in one direction is placed directly side by side with the pipe of the adjacent pair which has an opposite convergence.

However, the spacing between the tubes of the same pair and the spacing of adjacent tubes of two different pairs will be a function of the number of tubes that are to equip the nozzle and the diameter of the latter. In fact, in the example illustrated, said nozzle (1) comprises eight pairs (3, ..., 10) of pipes. It is of course self-evident that this is an example implementation given by way of illustration, the number of pairs of pipes possibly being smaller or larger. The number of pairs of pipes attached to the nozzle (1) will in particular be a function of the size of the jet engine, but also of the noise pollution of the jet engines.

Thus, in order to reduce the noise connected with the propulsion jets of the jet engines at the time of the takeoff phase or the approach phase of the aircraft, blowing of compressed air through the air supply conduits to the pipes distributed at the output ring of said nozzle (1) is initiated. The ring concerned can be either that separating the hot flow and the cold flow (inner ring), or that separating the cold flow and the ambient air (engine nacelle ring). Through the positioning of the pipes at the output ring and their distribution, the compressed air jets are propelled out of the pipes with incidences of convergence and penetration, then disturbing the propulsion jet according to fluid interaction triangles in the direction of the flow.

The air jets consist of controlled jets. Connected to the high pressure part of the jet engine, their supply is made effective only in the phases where control is necessary (generally during the takeoff or landing phases). Outside these phases, the disturbance means are made completely inert simply by stopping the blowing. Aircraft equipped in this way have no penalty in terms of drag or loss of thrust.

Advantageously, the air jets can be operated independently of one another, thus providing a disturbance device for the primary jet which is particularly flexible. According to a particular embodiment of the invention, only one jet out of two can be actuated, therefore generating a rotation of the propulsion jets. According to another particular embodiment of the invention, partial activation of said jets can also be envisaged: actuation of the jets positioned at the top, at the bottom, on the right or on the left of said nozzle (1), thus modifying the directivity of the sound emissions.

According to another embodiment, the control jets can be actuated in an irregular manner to reduce the throughputs of said control jets or to improve the performance of said control.

The invention is described above by way of an example. It is understood that persons skilled in the art are in a position to implement different variants of the invention without for all that departing from the scope of the patent.

Advantageously, the device can be put in place equally well on one or other or jointly on the two faces of the engine output ring (internal and external), thus implementing chevrons with internal and/or external penetration.

Advantageously, in the case of double-flow jet engines, the device can be put in place on the output lips of the ring surrounding the inner jet (hot jet) but also on the ring constituting the outer part surrounding the cold jet (nacelle) or at the same time on both rings.

The invention claimed is:

1. An aircraft jet engine comprising a nozzle (1) ejecting a propulsion jet, or comprising the confluence of two propulsion jets, said nozzle (1) having one or two output rings (2) which comprise means of disturbing said propulsion jet or jets consisting of at least one pair (3 to 10) of conduits (3a, 3b, ..., 10a, 10b) via which jets of air are ejected, said conduits (3a, 3b, ..., 10a, 10b) opening at the output of said nozzle (1), the conduits (3a, 3b, ..., 10a, 10b) of each pair (3 to 10) being disposed convergent with respect to each other in order to generate at the output a region of interaction of the air jets, wherein the conduits (3a, 3b, ..., 10a, 10b) of each pair (3 to 10) converge towards each other at the output of said nozzle (1) with an angle of convergence lying between 40 degrees and 70 degrees.

2. An aircraft jet engine according to claim 1, wherein the conduits (3a, 3b, ..., 10a, 10b) are disposed at the output ring (2) in order to have, with respect to the axis of the propulsion jet, an angle of penetration lying between 8 degrees and 40 degrees.

3. An aircraft jet engine according to either claim 1 or claim 2, wherein the disturbance means comprise 1 to 24 pairs of conduits.

4. An aircraft jet engine according to claim 2, wherein the pairs of conduits (3a, 3b, ..., 10a, 10b) are distributed over the output ring (2) so that a conduit converging in one direction is placed side by side with a conduit, of opposite convergence, of the adjacent pair of conduits.

5. An aircraft jet engine according to claim 2, wherein the conduits (3a, 3b, ..., 10a, 10b) consist of pipes distributed over one or both walls of said output ring (2).

6. An aircraft jet engine according to claim 2, wherein the conduits (3a, 3b, ..., 10a, 10b) consist of channels incorporated into the thickness of the output ring (2).

7. An aircraft jet engine according to claim 1, wherein the conduits (3a, 3b, ..., 10a, 10b) are connected to a compressed air supply via an air supply conduit, the supply being implemented preferably at the high pressure part of said jet engine.

8. An aircraft jet engine according to claim 7, wherein the air supply conduit of one conduit of a pair constitutes the supply conduit of the conduit of the adjacent pair which has an opposite convergence.

9. An aircraft jet engine according to claim 1, wherein the conduits (3a, 3b, ..., 10a, 10b) have a diameter 20 to 50 times smaller than that of the nozzle (1) at the output.

10. An aircraft jet engine according to claim 1, wherein the air jets (2) converge with respect to the axis of the nozzle with an angle lying between 8 degrees and 40 degrees.

11. An aircraft jet engine according to claim 7, wherein the air jets consist of controlled air jets.

12. An aircraft jet engine according to claim 1, wherein the pairs of conduits are distributed symmetrically over the output ring (2) of said nozzle (1).

13. An aircraft jet engine according to claim 1, wherein the pairs of conduits are distributed non-symmetrically over the output ring (2) of said nozzle (1).

14. An aircraft jet engine according to claim 1, wherein it comprises means for dragging rotationally over themselves the air jets ejected by said conduits.

15. An aircraft jet engine according to either claim 1 or claim 2, wherein the mass ratio between the throughput of the air jets ejected by said conduits and that of the propulsion jet lies between approximately 0.3% and 2%.

16. An aircraft comprising jet engines according to either claim 1 or claim 2.

17. An aircraft jet engine according to claim 1, wherein the angle of convergence is of the order of 60 degrees.

18. An aircraft jet engine according to claim 2, wherein the angle of penetration is of the order of 20 to 35 degrees.

* * * * *

UNITED STATES PATENT AND TRADEMARK OFFICE
CERTIFICATE OF CORRECTION

PATENT NO.        : 8,020,368 B2
APPLICATION NO.   : 11/649721
DATED             : September 20, 2011
INVENTOR(S)       : Bonnet et al.

It is certified that error appears in the above-identified patent and that said Letters Patent is hereby corrected as shown below:

Title page, Item (73) Assignee: Change order of appearance of Assignees - "Centre National de la Recherche Scientifique-CNRS", Paris Cedex (FR); "Université de Poitiers", Poitiers Cedex (FR).

Item (75) Inventors: Correct spelling of first-named inventor's residence - --"Poitiers"--; delete "Poitier"

Signed and Sealed this
Third Day of April, 2012

David J. Kappos
*Director of the United States Patent and Trademark Office*